(12) United States Patent
Videto et al.

(10) Patent No.: US 6,675,795 B2
(45) Date of Patent: Jan. 13, 2004

(54) FREEZE RESISTANT METHOD FOR DRAINING FURNACE CONDENSATE IN LOW TEMPERATURE ENVIRONMENTS

(75) Inventors: Brian David Videto, Cortland, NY (US); Robert Henry Swieczkowski, Cazenovia, NY (US)

(73) Assignee: Carrier Corporation, Syracuse, NY (US)

(*) Notice: Subject to any disclaimer, the term of this patent is extended or adjusted under 35 U.S.C. 154(b) by 158 days.

(21) Appl. No.: 09/781,660

(22) Filed: Feb. 12, 2001

(65) Prior Publication Data

US 2002/0108607 A1 Aug. 15, 2002

(51) Int. Cl.[7] ................................................. F16T 1/00
(52) U.S. Cl. .................. 126/110 R; 137/177; 137/396; 137/624.11; 137/624.14; 431/119
(58) Field of Search ................. 126/110 R, 116 A, 126/99 R; 137/395, 396, 177, 624.11, 624.14; 62/188, 289; 431/119

(56) References Cited

U.S. PATENT DOCUMENTS

| | | | | | |
|---|---|---|---|---|---|
| 3,429,329 A | * | 2/1969 | Berkley | ....................... | 137/188 |
| 3,575,199 A | * | 4/1971 | Beattie | ....................... | 137/341 |
| 4,289,730 A | * | 9/1981 | Tomlinson | ................... | 422/178 |
| 4,449,484 A | * | 5/1984 | Sakamoto et al. | ......... | 122/18.3 |
| 4,515,145 A | * | 5/1985 | Tallman et al. | ......... | 126/110 R |
| 4,682,579 A | * | 7/1987 | Bigham | ................... | 126/110 R |
| 4,729,328 A | * | 3/1988 | Shellenberger | ............. | 110/193 |
| 4,856,550 A | * | 8/1989 | Smelcer | ................... | 126/110 R |
| 5,115,798 A | * | 5/1992 | Moore et al. | ........... | 126/110 R |
| 5,531,241 A | * | 7/1996 | Rasmussen | ................. | 137/396 |

FOREIGN PATENT DOCUMENTS

EP 81826 A2 * 6/1983 ................. 137/396

* cited by examiner

Primary Examiner—Henry Bennett
Assistant Examiner—James G. Barrow
(74) Attorney, Agent, or Firm—Carlson, Gaskey & Olds

(57) ABSTRACT

A freeze resistant method for draining liquid condensate from a condensate furnace includes quickly purging the liquid condensate from a condensate reservoir. A condensing heat exchanger connected to a condensing reservoir stores liquid condensate as the system is in use. An inducer produces a positive pressure along a condensate line to the outlet of the reservoir, creating a back pressure which prevents draining of the reservoir. When the inducer is shut off, the positive pressure is removed, and the liquid condensate rapidly flushes from the reservoir. The amount of liquid condensate remaining in the system and exposed to cold conditions can be minimized.

10 Claims, 3 Drawing Sheets

FREEZE RESISTANT METHOD FOR DRAINING FURNACE CONDENSATE IN LOW TEMPERATURE ENVIRONMENTS

BACKGROUND OF THE INVENTION

The present invention relates generally to a freeze resistant method for draining furnace condensate in low temperature environments.

Condensing furnaces are designed to be installed indoors where there is little chance of freezing. Condensing furnaces often employ a condensing heat exchanger which recovers additional heat from the system by condensing water vapor from combustion gases. The liquid condensate, primarily water with a temperature exceeding 100° F., is normally drained away from the furnace and disposed. The flow rate of the condensate is quite small, around four to eight pounds per hour for a typical residential gas furnace. Therefore, the condensate drains out of the system very slowly, and thus cools down rapidly. This makes it difficult to operate a condensing furnace in low temperature environments due the tendency of this liquid condensate to subsequently freeze. If the condensate freezes before being removed from the system, the frozen condensate can block the flow of the flue path, causing damages to the furnace or posing a safety risk.

For the above reasons, condensing furnaces are not designed to operate outdoors. However, they are often installed in unheated spaces where temperatures may drop below freezing. Electrical heating tape can be utilized to prevent freezing, but there are several disadvantages to utilizing this method. Heat tape is expensive and has poor reliability. Additionally, there are safety concerns with utilizing heat tape.

Hence, there is a need in the art for a freeze resistant method for draining furnace condensate in low temperatures.

SUMMARY OF THE INVENTION

The present invention relates to a freeze resistant method for draining furnace condensate in low temperature environments.

In the preferred embodiment, a condensate reservoir is connected to a condensing heat exchanger of a condensing furnace. The condensing heat exchanger recovers heat from the system by condensing water vapor from combustion gases, producing a liquid condensate which accumulates in the condensate reservoir.

In one embodiment, a condensate line connects the discharge inducer fan to the side of the outlet of the condensate reservoir. The inducer provides a source of suction on the condensing heat exchanger and assists in pulling the flow of the combustion products through the system. During operation, the inducer produces a positive pressure along the condensate line, creating a back pressure on the outlet of the reservoir. This prevents draining of the condensate reservoir and allows the fluid to accumulate. When the system and the inducer are shut off, the positive pressure placed on the outlet of the reservoir is removed, allowing the liquid condensate to quickly flush from the reservoir.

By rapidly flushing the still warm liquid condensate out of the system with a high rate of flow, the amount of condensate remaining in the system after operation and exposed to cold conditions can be minimized. As the liquid condensate is rapidly flushed from the condensate reservoir, it travels to a condensate trap and is then drained. The liquid condensate can either drain into an outdoor unheated space or into an adjacent indoor heated space.

In an alternative embodiment, a valve is positioned proximate to the output of the condensate reservoir. The valve is opened when the liquid condensate is to be flushed, allowing rapid expulsion of the liquid condensate from the system. Alternatively, closing and opening this valve has the same function of applying and removing back pressure from the inducer.

In another alternative embodiment, the condensate reservoir is integrated as a part of the condensing heat exchanger, rather than a separate component located proximate to the condensing heat exchanger.

In another feature, controls are employed to regulate the amount of liquid condensate in the condensate reservoir and to prevent overflow. A control regulates the "on" time of the system. The system would automatically shut off and the reservoir drains after a specified period of time had elapsed. In another embodiment, a level detector can be employed. When a high level of liquid condensate is detected in the reservoir, the system would be interrupted to purge the reservoir. After flushing, the system then resumes.

Accordingly, the present invention provides a freeze resistant method for draining furnace condensate in low temperatures environments.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
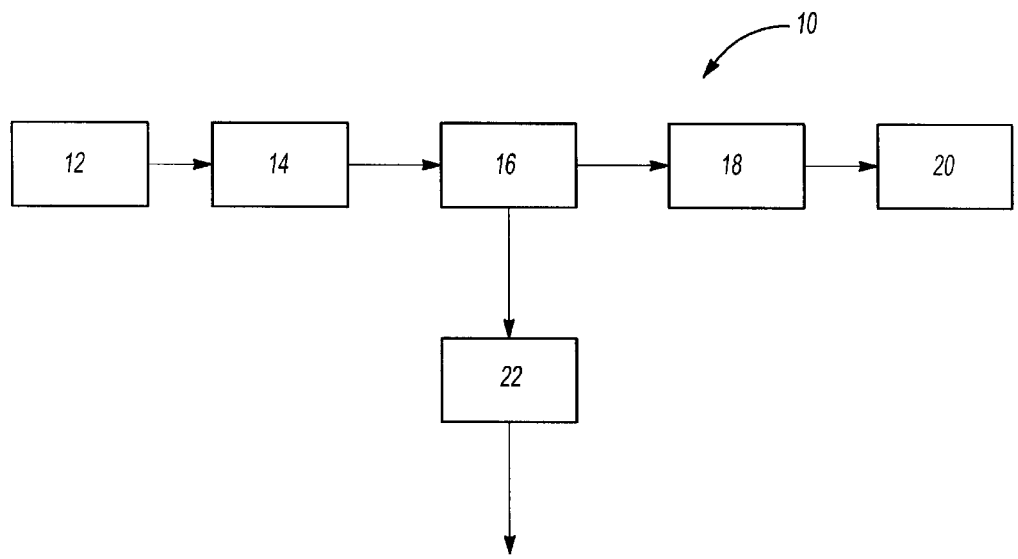
FIG. 1 illustrates a schematic diagram of a prior art condensing furnace.

FIG. 1 schematically illustrates a prior art condensing furnace system 10. The condensing furnace system 10 consists of a burner 12, a primary heat exchanger 14, a condensing heat exchanger 16, and an inducer 18.

In the condensing furnace system 10, the air and natural gas enters the burner 12. The burner 12 burns the air and natural gas to produce hot combustion products. The hot combustion products pass through the primary heat exchanger 14, which cools the hot combustion products and extracts heat. After exiting the primary heat exchanger 14, the hot combustion products have a temperature of approximately 400° F.

To increase the efficiency of the system 10, more heat is extracted by next employing a condensing heat exchanger 16. As the hot combustion gases pass through the condensing heat exchanger 16, the temperature drops to 130° F., the dewpoint of the combustion products. Water vapor begins to condense, allowing more heat to be extracted from the combustion products, increasing efficiency. The inducer fan 18 provides a source of suction on the condensing heat exchanger 16 and assists in pulling the flow of the combustion products through the system 10. The combustion products are then expelled through the flue 20.

In the prior art system 10, the liquid condensate formed from the condensing heat exchanger 16 slowly drains and collects in a condensate trap 22. The function of the condensate trap 22 is to ensure that condensate can freely drain out of the condensing heat exchanger 16 but that air cannot be pulled in under suction from the inducer 18. Because the liquid condensate drains slowly, liquid condensate may freeze before it completely exits the system when temperatures are low. If the condensate freezes, it can block or damage the system.

Figure 2:
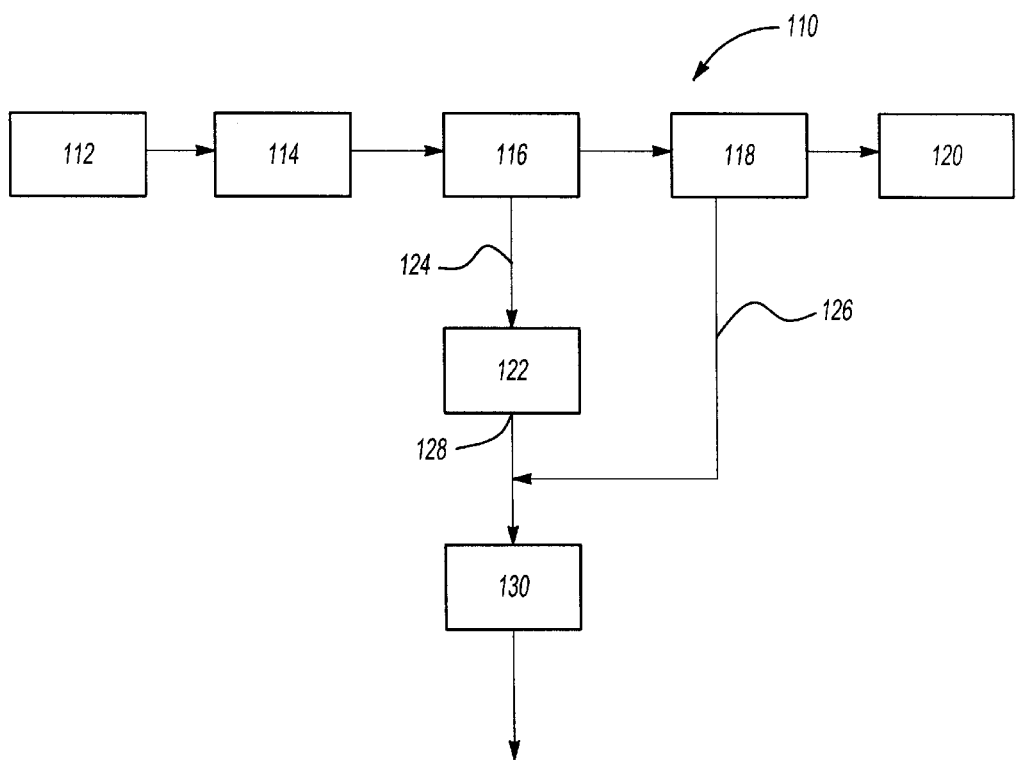
FIG. 2 illustrates a schematic diagram of a condensing furnace employing condensate reservoir.

FIG. 2 schematically illustrates an inventive condensing furnace system 110 employing a condensate reservoir 122. As in the prior condensing furnace system 10, the condensing furnace system 110 of the present invention includes a burner 112, a primary heat exchanger 114, a condensing heat exchanger 116, an inducer fan 118, and a flue 120. The condensate reservoir 122 is connected to the condensing heat exchanger 116 by a first line 124 and stores liquid condensate therein. During operation, liquid condensate accumulates in the reservoir 122 as it exits the condensing heat exchanger 116.

A condensate line 126 connects the discharge side of the inducer 118 to the outlet 128 of the condensate reservoir 122. During operation, the inducer 118, which is a fan that induces a draft, creates a positive pressure along the condensate line 126, creating a back pressure on the outlet 128 of the reservoir 122. This back pressure blocks the liquid condensate from purging from the condensate reservoir 122, effectively closing the outlet and causing the condensate to accumulate.

When the system 110 and the inducer 118 are shut off, the positive pressure provided on the outlet 128 of the reservoir 122 is removed. As the pressure on the outlet 128 of the condensate reservoir 122 is removed, the outlet 128 effectively opens, allowing the accumulated liquid condensate to rapidly flush from the reservoir 128. By rapidly flushing the warm liquid condensate from the reservoir 118, the condensate an be drained and disposed rapidly with little opportunity for freezing. Any liquid condensate remaining is minimal, and in the event that this residual condensate freezes it will be quickly melted and flushed away when the next cycle of the system 110 is resumed. After the liquid condensate is rapidly flushed from the condensate reservoir 122, the liquid condensate travels to a condensate trap 130 and is then drained. The liquid condensate can drain either into an outdoor unheated space or into an indoor heated space.

In the preferred embodiment, the condensate reservoir 122 is a separate component located proximate to the condensing heat exchanger 116. However, the condensate reservoir 122 could be integrated as a part of the condensing heat exchanger 116. If the condensate reservoir 122 is integrated as a part of the condensing heat exchanger 116, the liquid condensate that accumulates collects in a collector box in the condensing heat exchanger 116.

Figure 3:
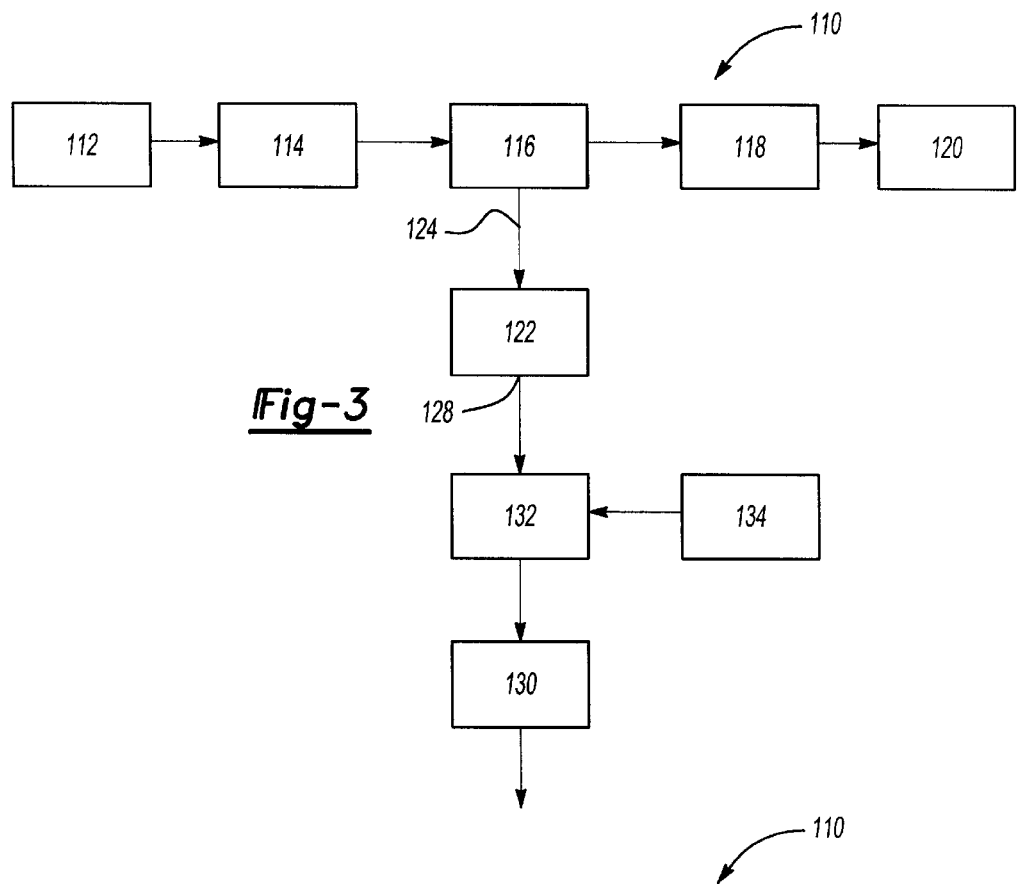
FIG. 3 illustrates a schematic diagram of a condensing furnace employing a condensate reservoir utilizing a valve.

In an alternative embodiment, as shown in FIG. 3, a valve 132 controlled electrically by a control 134 can be employed to control the release of the liquid condensate from the reservoir 116 and out of the system 110. During operation, the valve 132 is closed to allow liquid condensate to accumulate in the reservoir 122. When opened, liquid condensate rapidly purges from the system 110.

Figure 4:
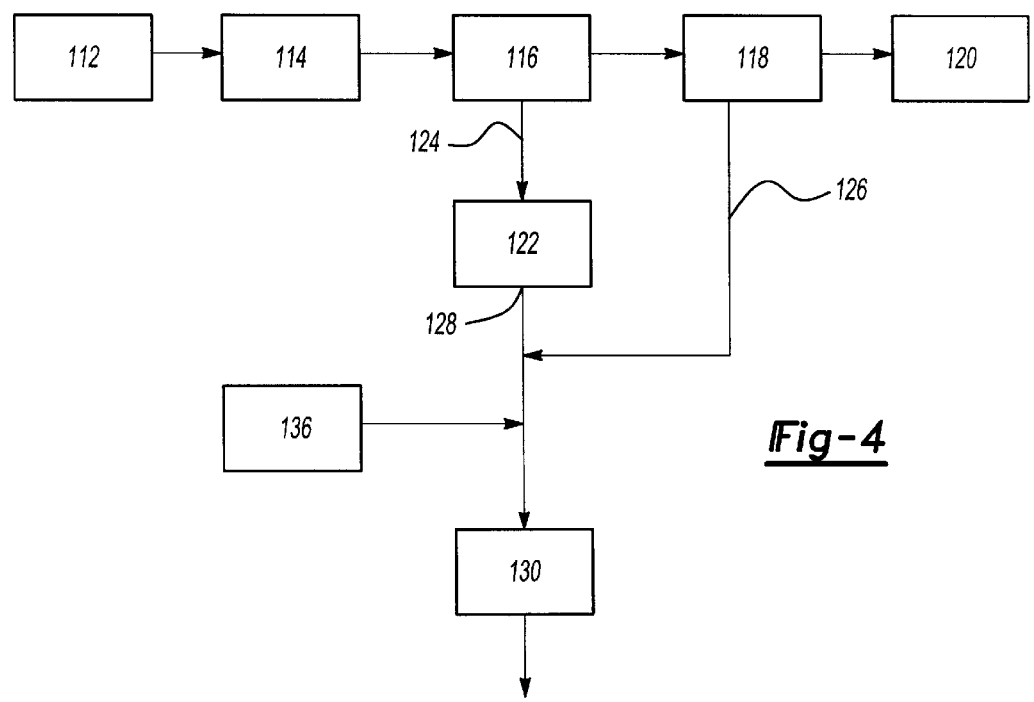
FIG. 4 illustrates a schematic diagram of a condensing furnace utilizing a control which purges the condensate tank after a predetermined amount of time.

It is preferred that precautions are employed to prevent the condensate reservoir 122 from overflowing. In one embodiment, as shown schematically in FIG. 4, a control 136 can be added to the system 110 to control the "on" time of the system 110. After the system 110 has been in operation for a specified amount of time, the system 110 will automatically shut down for a short period of time (i.e. one minute) and release the stored liquid condensate from the condensate reservoir 122 by opening the outlet 128. After shutting down for the short period of time and the flushing of the stored liquid condensate, heating resumes.

Figure 5:
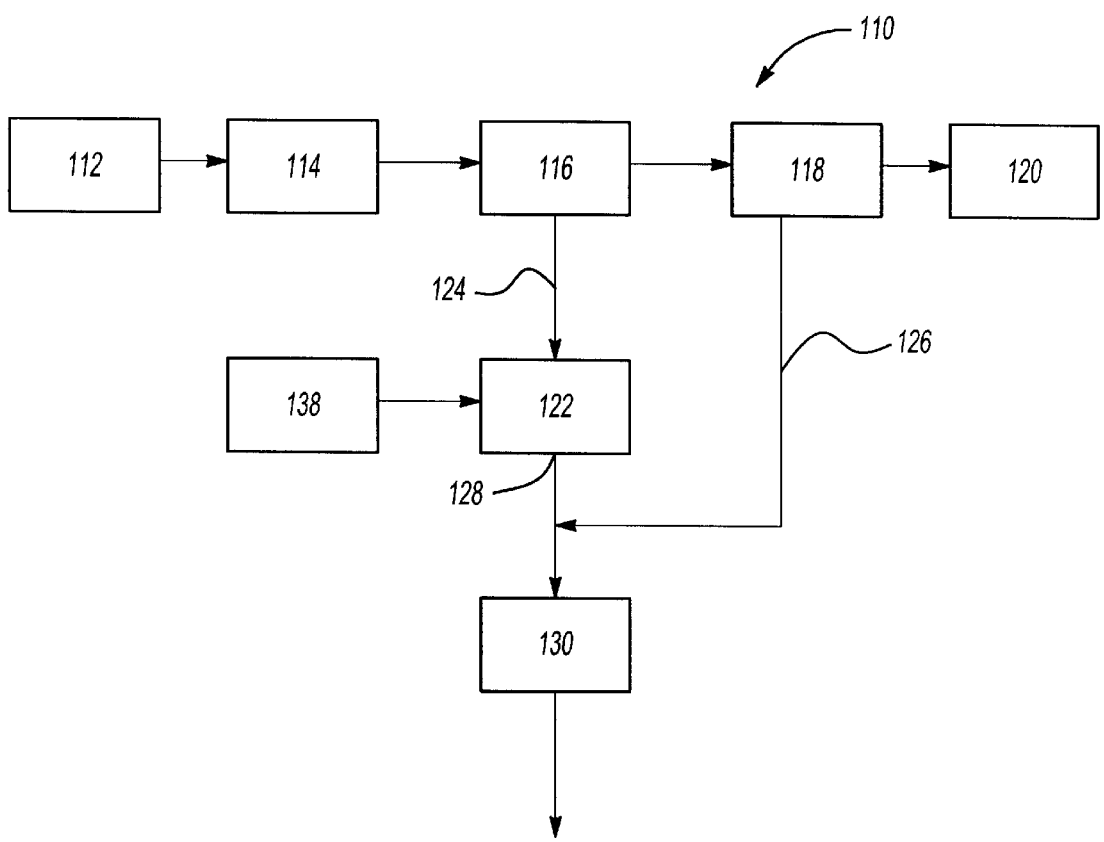
FIG. 5 illustrates a schematic diagram of a condensing furnace utilizing a level detector which purges the condensate tank when the liquid condensate reaches a predetermined level.

In another embodiment, as illustrated schematically in FIG. 5, overflow is prevented by employing a level detector 138 in the reservoir 122. When a high level of liquid condensate is detected, the system 110 is shut down to allow reservoir 122 to purge through the outlet 128. Heating would then resume after purging. These controls can each be used with either of the FIG. 2 or FIG. 3 embodiments.

There are several advantages to employing a freeze resistant method for draining furnace condensate in low temperature environments. For one, the system 110 can be utilized in low temperatures. As the liquid condensate is flushed from the condensate reservoir 122 rapidly, opportunity for freezing which may cause blockage in or damage to the system 110 is minimized. Additionally, this method can be implemented with few additional parts or cost.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for draining a liquid condensate from a condensing furnace comprising the steps of:
   draining said liquid condensate from a condensing heat exchanger into a reservoir;
   retaining said liquid condensate in said reservoir by a positive pressure applied proximate to an outlet of said reservoir; and
   then purging said liquid condensate from said reservoir by removing said positive pressure from said outlet of said reservoir.

2. A method for draining a liquid condensate from a condensing furnace comprising the steps of:
   draining said liquid condensate from a condensing hear exchanger into a reservoir;
   retaining said liquid condensate in said reservoir;
   deactivating the condensing furnace;
   then purging said liquid condensate from said reservoir after the step of deactivating the condensing furnace; and regulating a level of said liquid condensate in said reservoir by employing a level detector, said liquid condensate purging from said reservoir when said level detector detects a predetermined level of said liquid condensate.

3. The method as recited in claim 2 further including the step of activating the condensing furnace after the step of purging said liquid condensate from said reservoir.

4. A method for draining a liquid condensate from a condensing furnace comprising the steps of:

draining a liquid condensate from a condensing heat exchanger into a reservoir;

retaining said liquid condensate in said reservoir;

then purging said liquid condensate from said reservoir; and regulating a level of said liquid condensate in said reservoir, by purging said liquid condensate after a predetermined length of time.

5. A condensate reservoir for use with a condensing heat exchanger comprising:

said condensate reservoir to retain a liquid condensate drained from a condensing heat exchanger;

a first line connecting said condensing hear exchanger to said condensate reservoir; and a system for purging said liquid condensate from said condensate reservoir positioned proximate to an outlet of said condensate reservoir, wherein said system for purging said liquid condensate is a positive pressure applied by an inducer proximate to said outlet of said condensate reservoir along a second line connecting said inducer to said outlet of said condensing reservoir and said liquid condensate is purged from condensate reservoir by removing said positive pressure from said condensate reservoir.

6. A condensate reservoir for use with a condensing heat changer comprising:

said condensate reservoir to retain a liquid condensate drained from a condensing heat exchanger;

a first line connecting said condensing heat exchanger to said condensate reservoir;

a system for purging said liquid condensate from said condensate reservoir positioned proximate to an outlet of said condensate reservoir and purging said liquid condensate from said condensate reservoir after a predetermined length of time; and a system to regulate a level of said liquid condensate.

7. A condensing furnace comprising:

a burner to produce a combustion product;

a primary heat exchanger to extract heat from said combustion product;

a condensing heat exchanger to further extract heat from said combustion product to condense a liquid condensate from said combustion product;

an inducer to drive said condensing furnace;

a condensate reservoir having an outlet to retain said liquid condensate drained therefrom;

a first line connecting said condensing heat exchanger to said condensate reservoir;

a system for purging said liquid condensate from said condensate reservoir positioned proximate to said outlet of said reservoir, said wherein said system for purging releases said liquid condensate from said condensate reservoir after a predetermined length of time; and a system to regulate a level of said liquid condensate.

8. A condensing furnace comprising:

a burner to produce a combustion product;

a primary heat exchanger to extract heat from said combustion product;

a condensing heat exchanger to further extract heat from said combustion product to condense a liquid condensate from said combustion product;

an inducer to drive said condensing furnace;

a condensate reservoir having an outlet to retain said liquid condensate drained therefrom;

a first line connecting said condensing heat exchanger to said condensate reservoir; and a system for purging said liquid condensate from said condensate reservoir positioned proximate to said outlet of said reservoir, wherein said system for purging said liquid condensate is a positive pressure applied by said inducer proximate to said outlet of said condensate reservoir along a second line connecting said inducer to said outlet of said condensing reservoir and said liquid condensate is purged from reservoir by removing said positive pressure from said condensate reservoir.

9. The condensate furnace as recited in claim 7 wherein said system for purging said liquid condensate and said condensing heat exchanger are separate components.

10. The condensate furnace as recited in claim 7 wherein said system for purging said liquid condensate is integrated within said condensing heat exchanger.

* * * * *

UNITED STATES PATENT AND TRADEMARK OFFICE
CERTIFICATE OF CORRECTION

PATENT NO. : 6,675,795 B2
DATED : January 13, 2004
INVENTOR(S) : Videto et al.

It is certified that error appears in the above-identified patent and that said Letters Patent is hereby corrected as shown below:

<u>Column 4,</u>
Line 59, "hear" should be -- heat --

<u>Column 5,</u>
Line 23, "hear" should be -- heat --
Line 36, "changer" should be -- exchanger --

Signed and Sealed this

Second Day of March, 2004

JON W. DUDAS
*Acting Director of the United States Patent and Trademark Office*